United States Patent [19]
Dombek

[11] Patent Number: 6,142,289
[45] Date of Patent: Nov. 7, 2000

[54] APPARATUS FOR REMOVING ROD-SHAPED ARTICLES OF THE TOBACCO PROCESSING INDUSTRY FROM THE RECEPTACLES OF A ROTARY CONVEYOR

[75] Inventor: Manfred Dombek, Dassendorf, Germany

[73] Assignee: Hauni Maschinenbau AG, Hamburg, Germany

[21] Appl. No.: 09/249,793

[22] Filed: Feb. 16, 1999

[30] Foreign Application Priority Data

Feb. 14, 1998 [DE] Germany ............................ 198 06 125

[51] Int. Cl.⁷ ............................ B65G 17/46; B65G 17/74
[52] U.S. Cl. ........................................ 198/471.1; 198/803.5
[58] Field of Search .............................. 198/471.1, 803.5

[56] References Cited

U.S. PATENT DOCUMENTS

| | | |
|---|---|---|
| 3,520,177 | 7/1970 | Heitmann et al. . |
| 3,543,564 | 12/1970 | Heitmann et al. . |
| 3,720,310 | 3/1973 | Lehmann . |
| 5,329,945 | 7/1994 | Irikura et al. . |

FOREIGN PATENT DOCUMENTS

| | | |
|---|---|---|
| 0 585 776 | 9/1994 | European Pat. Off. . |
| 2 084 052 | 12/1971 | France . |
| 1187261 | 4/1970 | United Kingdom . |
| 1565206 | 4/1980 | United Kingdom . |

*Primary Examiner*—Christopher P. Ellis
*Assistant Examiner*—Ken Bower
*Attorney, Agent, or Firm*—Venable; George H. Spencer; Robert Kinberg

[57] ABSTRACT

Plain or filter cigarettes are expelled from selected or successive axially parallel peripheral flutes of a rotary drum-shaped conveyor by a rotary shaft-like valving element which is adjacent the internal surface of the cylindrical wall of the conveyor. The flutes of the conveyor communicate with first radial orifices which are connected to a suction chamber to attract the cigarettes to the surfaces of their flutes. When a cigarette is to be expelled from its flute, ports which are provided in the valving element connect a second set of orifices, communicating with the flute from which a cigarette is to be expelled at an ejecting or transferring station, with a source of compressed air the pressure of which is being built up ahead of the actual ejection and which is permitted to escape from the ports as the ejecting step is completed. The ports can be connected with the second orifices of selected flutes, with a pressure generating device or with the atmosphere by axial bores and arcuate grooves of the valving element.

20 Claims, 2 Drawing Sheets

APPARATUS FOR REMOVING ROD-SHAPED ARTICLES OF THE TOBACCO PROCESSING INDUSTRY FROM THE RECEPTACLES OF A ROTARY CONVEYOR

CROSS-REFERENCE TO RELATED CASES

This application claims the priority of German patent application Serial No. 198 06 125.0 filed Feb. 14, 1998. The disclosure of this German patent application, as well as of each and every other patent application and each and every patent mentioned in the specification of the present application, is incorporated herein by reference.

BACKGROUND OF THE INVENTION

The invention relates to improvements in apparatus for manipulating rod-shaped articles of the tobacco processing industry. More particularly, the invention relates to improvements in apparatus which can be utilized with advantage to expel selected or successive rod-shaped articles from receptacles (such as axially parallel flutes) provided at the periphery of a rotary conveyor. Still more particularly, the invention relates to improvements in apparatus for pneumatically expelling rod-shaped articles of the tobacco processing industry from the receptacles of a rotary conveyor, e.g., for the purpose of transferring such articles from one rotary conveyor onto another rotary conveyor, from a rotary conveyor onto an endless belt or chain conveyor, or into a collecting receptacle.

Rod-shaped articles of the tobacco processing industry which can be manipulated in the apparatus of the present invention include plain or filter cigarettes, cigars, cigarillos or the like of unit length or multiple unit length as well as filter rod sections of unit length or multiple unit length. Typical examples of such rod-shaped articles are commodities which are manipulated in certain types of so-called filter tipping machines wherein plain cigarettes are united with sections of filter rods to form therewith filter cigarettes of unit length or multiple unit length. For example, each such commodity can include a group of three coaxial components including a filter mouthpiece of double unit length located between two plain cigarettes of unit length. Reference may be had, for example, to U.S. Pat. No. 5,135,008 granted Aug. 4, 1992 to Erwin Oesterling et al. for "METHOD OF AND APPARATUS FOR MAKING FILTER CIGARETTES".

The apparatus which is described and shown in the patent to Oesterling et al. employs a plurality of rotary conveyors which transport rod-shaped articles sideways and can attract the articles by suction. Such conveyors are normally further provided (or cooperate) with means for expelling articles from their axially parallel peripheral flutes, e.g., for segregation of defective rod-shaped articles from satisfactory articles, for transfer of successive rod-shaped articles into the flutes of a next-following rotary drum-shaped or other conveyor, or for collection in a suitable receptacle or on a take-off conveyor. The removed articles can be examined, e.g., in a laboratory, in order to ascertain their density, weight and/or other characteristics which are important to the purchasers of rod-shaped smokers' products. The manner in which rod-shaped articles can be attracted to the surfaces bounding the axially parallel peripheral flutes of a rotary conveyor is disclosed, for example, in U.S. Pat. No. 4,969,551 granted Nov. 13, 1990 to Uwe Heitmann et al. for "METHOD OF AND APPARATUS FOR ROLLING ROD-SHAPED ARTICLES".

OBJECTS OF THE INVENTION

An object of the present invention is to provide an apparatus which renders it possible to predictably remove from their path selected rod-shaped articles of the tobacco processing industry while such articles are being advanced at an elevated speed and/or in close proximity to each other.

Another object of the invention is to provide the apparatus with novel and improved means for expelling rod-shaped articles of the tobacco processing industry from their flutes at the periphery of a rotary drum-shaped conveyor.

A further object of the invention is to provide the above outlined apparatus with novel and improved means for restoring the condition of its parts immediately following an article expelling or transferring operation.

An additional object of the invention is to provide a novel and improved fluid flow regulating device for use in the above outlined apparatus.

Still another object of the invention is to provide an apparatus which can reliably manipulate relatively short or long rod-shaped articles and which treats the articles gently regardless of their speed at the periphery of a rotary conveyor.

A further object of the invention is to provide a cigarette making or like machine which embodies one or more apparatus of the above outlined character.

Another object of the invention is to provide a filter tipping machine which embodies the above outlined apparatus.

An additional object of the invention is to provide a novel and improved method of reliably expelling or transferring rod-shaped articles of the tobacco processing industry from the axially parallel peripheral flutes of a rotary drum-shaped conveyor.

Another object of the invention is to provide a novel and improved combination of mechanical and Pneumatic components for use in the above outlined apparatus.

SUMMARY OF THE INVENTION

The invention resides in the provision of an apparatus for pneumatically expelling rod-shaped articles of the tobacco processing industry from peripheral receptacles of a rotary conveyor which transports the receptacles along a predetermined path past an article ejecting station and which has at least one compressed-air orifice for each of its receptacles. The improved apparatus comprises a rotary valving element, means for rotating the valving element in synchronism with the conveyor, a stationary source of compressed air adjacent the valving element, and air evacuating means adjacent the valving element. The valving element has at least one substantially radially extending port and at least one channel extending in part circumferentially of the valving element to connect the at least one port with the source of compressed air and with the orifice for a receptacle at the ejecting station during a first stage of each revolution of the valving element and to thereafter connect the at least one port with the air evacuating means during a second stage of each revolution of the valving element.

The conveyor can have a plurality of compressed-air orifices for each of its receptacles, and the valving element can have a plurality of ports, at least one for each of the plurality of channels and each communicating with at least one of the plurality of orifices. The at least one channel can include a section which communicates with the at least one port and extends at least substantially in the axial direction of the valving element. Such channel can further include a portion connecting the section with the source of compressed air and with the air evacuating means during the respective stages of each revolution of the valving element.

The apparatus normally further comprises at least one stationary bearing member which can include the aforementioned source of compressed air and/or the air evacuating means. The valving element (which can comprise a shaft) is rotatably journalled in the at least one bearing member.

The receptacles can include elongated flutes, and the conveyor can be provided with a plurality of orifices for each of its flutes. The orifices of each such plurality of orifices are or can be spaced apart from each other in the longitudinal direction of the respective flute, and the valving element can have a discrete port for each orifice of a plurality of orifices. Furthermore the valving element can be provided with at least two channels. In accordance with a presently preferred embodiment, the conveyor has two pairs of orifices for each of its flutes and the valving element has four ports each communicating with a discrete orifice for the flute at the ejecting station. Each of the at least two channels in the valving element connects two of the ports with the respective pair of orifices, each of the at least two channels connects the ports with the source of compressed air during the first stage of each revolution of the valving element, and each of the at least two channels connects the ports with the air evacuating means during the second stage of each revolution of the valving element.

The apparatus further comprises means for driving the conveyor, and the means for rotating the valving element in synchronism with the conveyor can receive motion from such driving means. For example, the means for driving the conveyor can comprise a shaft and the means for rotating the valving element can comprise at least one endless flexible element (such as a toothed belt) which is trained over portions of the shaft and the valving element.

If its receptacles are elongated flutes, the conveyor can be provided with a plurality of groups (such as pairs) of orifices for each flute. The orifices of each group are preferably spaced apart from each other in the longitudinal direction of the respective flute.

The valving element can be provided with at least one substantially radially extending additional port and with at least one additional channel extending in part circumferentially of the valving element and connecting the additional port with the source and with the orifice for a receptacle at the ejecting station during a third stage of each revolution of the valving element. Thereafter, the at least one additional channel connects the at least one additional port with the air evacuating means during a fourth stage of each revolution of the valving element.

The conveyor and the valving element can be mounted for rotation about parallel axes. Furthermore, the space requirements of the apparatus are reduced considerably if the conveyor is a hollow drum and at least a portion of the valving element is confined in the hollow drum. The latter can comprise a cylindrical wall having an external surface which is provided with the receptacles and an internal surface adjacent the confined portion of the valving element.

The duration of each of the aforediscussed stages is preferably selected with a view to ensure the establishment (in the ports) of a predetermined maximum air pressure during the first stage and to ensure the establishment in the ports of a predetermined minimum air pressure (which can at least approximate atmospheric pressure) during the second stage of each revolution of the valving element. The same preferably holds true for the aforementioned third and fourth stages of each revolution of the valving element. Each first (and third) stage is preferably selected to permit a gradual rise of air pressure in the ports, and each second (and fourth) stage is preferably selected to effect a gradual drop of air pressure in such ports. In other words, the duration of each stage influences the rate and the extent of the buidup or drop of air pressure in the ports of the valving element.

The duration of each first or third stage can at least approximate the duration of each second or fourth stage.

The novel features which are considered as characteristic of the invention are set forth in particular in the appended claims. The improved apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
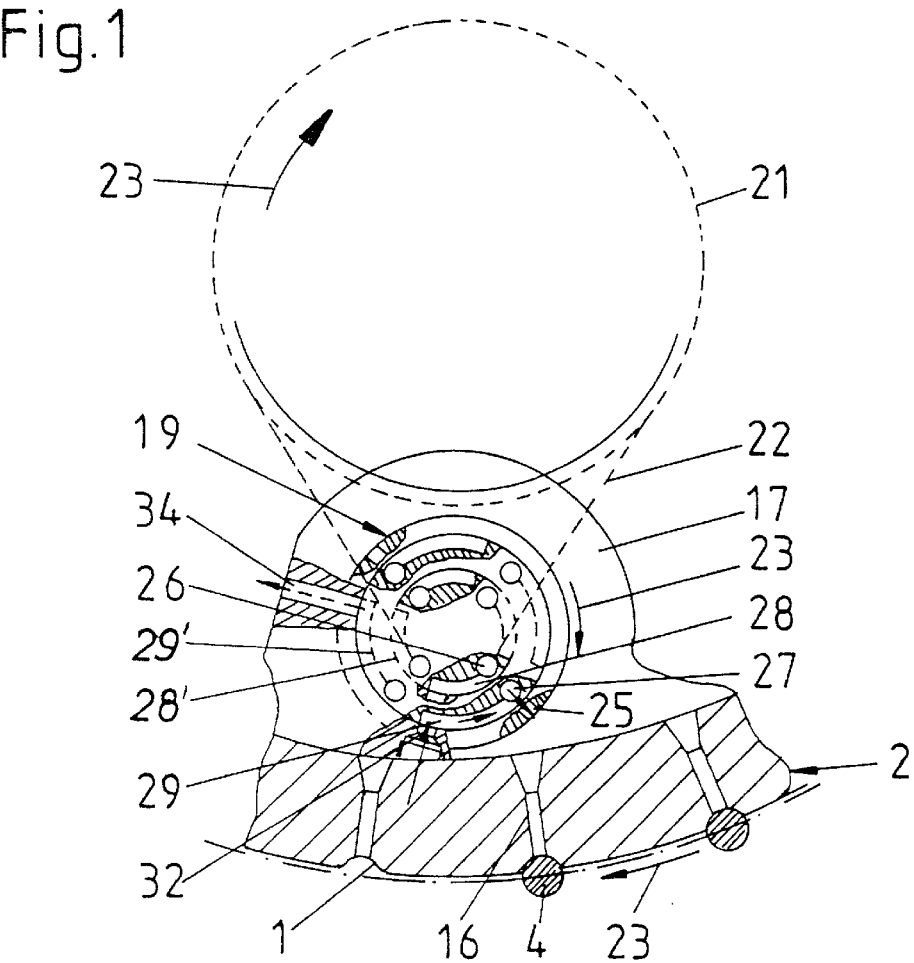
FIG. 1 is a fragmentary partly end elevational and partly transverse sectional view of an apparatus which embodies one form of the invention, the valving element being shown in an angular position in which its ports are out of communication with the orifices of the rotary conveyor for rod-shaped articles.

The apparatus which is shown in the drawings comprises or cooperates with a hollow rotary drum-shaped conveyor 2 having a cylindrical wall with an external surface provided with a plurality of axially parallel receptacles in the form of elongated flutes 1. The means for rotating the coveyor 2 about its axis 3 comprises a drive shaft 21 receiving torque from a suitable prime mover, not shown.

The rod-shaped articles 4 which are partially confined in their flutes and are transported along an arcuate path about the axis 3 in a clockwise direction (as indicated by the arrows 23 in the lower parts of FIGS. 1 and 2) from a receiving station (not shown) are filter cigarettes of double unit length. Each such filter cigarette comprises a filter rod section (7+7) of double unit length and two plain cigarettes 6 flanking the filter rod section. When a satisfactory article 4 is severed in the plane 8 shown in FIG. 3, it yields two filter cigarettes of unit length each having a plain cigarette 6 and a mouthpiece 7. Such severing can take place on the conveyor 2 or on a next-following conveyor (e.g., the rotary drum-shaped conveyor 37 a portion of which is shown (by dot-dash lines) in FIG. 2).

The articles 4 are pneumatically attracted to the surfaces bounding the respective flutes 1 by a suction chamber 13 (shown in FIG. 3) via suction openings or ports 14 provided in the cylindrical wall of the conveyor 2. The two openings 14 are spaced apart from each other in the longitudinal direction of the respective flute 1. The number of openings 14 for each flute 1 can exceed two; for example, the number of such openings can match the number (five in FIG. 3) of aligned sections (12, 11, 9, 11, 12) of each flute 1.

Figure 3:
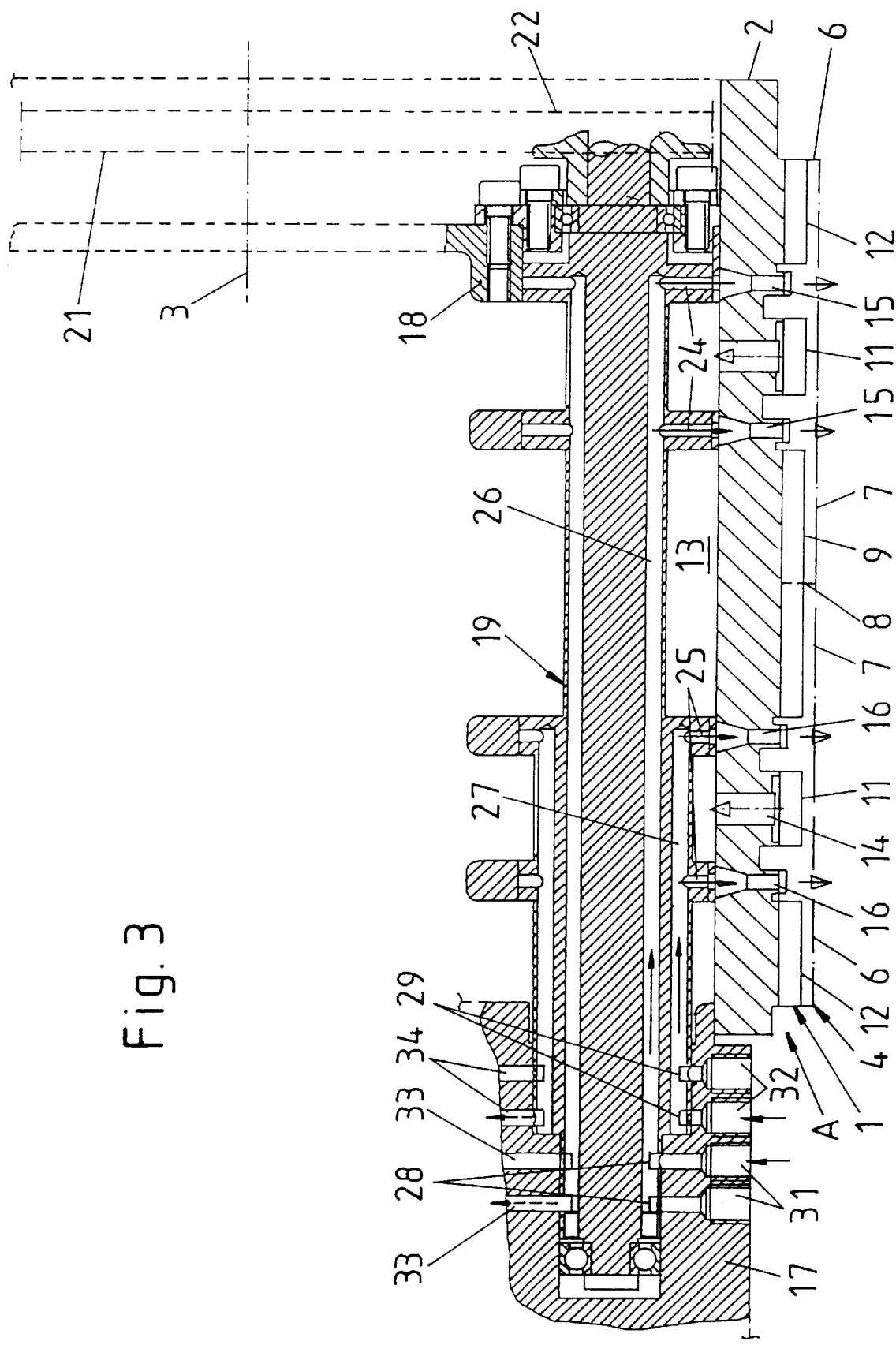
FIG. 3 is an axial sectional view of the valving element and a fragmentary axial sectional view of the other constituents of the apparatus of FIGS. 1 and 2, with the valving element and the conveyor in angular positions corresponding to those shown in FIG. 2.

The cylindrical wall of the rotary conveyor 2 is further provided with two pairs of openings or orifices 15, 16 (hereinafter called orifices) which serve to discharge streamlets or jets of a compressed fluid (normally air and hereinafter referred to as air) in order to expel an article 4 from that flute 1 which is then located at an article ejecting or transferring station A. In the illustrated embodiment, the conveyor 2 has a pair of axially spaced-apart orifices 15 and a pair of axially spaced-apart orifices 16 for each of its flutes 1. The orifices 15 and 16 are adjacent the respective end portions of and communicate with the respective flutes 1. One of the orifices 15 shown in FIG. 3 is located between the right-hand sections 11, 12 and the other orifice 15 is located between the right-hand sections 9, 11 of the flute 1 at the six o'clock position as viewed in FIG. 3 (i.e., of the flute at the ejecting station A). Analogously, one of the orifices 16 shown in FIG. 3 is located between the left-hand sections 11, 12 and the other orifice 16 is located between the left-hand sections 9, 11 of the flute 1 which is shown in FIG. 3.

The improved apparatus further comprises a novel and improved valve including two spaced-apart stationary bearing members 17, 18 and an elongated valving element 19 in the form of a shaft having end portions which are rotatably journalled in the respective bearing members 17, 18. The bearing member 18 and a substantial portion of the valving element 19 (hereinafter called spool for short) are confined in the interior of the hollow conveyor 2. A portion of the external surface of the spool 19 is adjacent the internal surface of the cylindrical wall of the conveyor 2.

The spool 19 is rotated in synchronism with the conveyor 2. The means for rotating the spool 9 in synchronism with the conveyor 2 comprises an endless flexible element 22 (e.g., an internally toothed belt) which is trained over a first pulley or gear (not specifically shown) on the drive shaft 21 for the conveyor 2, and over a second pulley or gear (not shown) on a portion of the spool 19 extending beyond the bearing member 18. The endless flexible synchronizing element 22 cooperates with the two pulleys or gears to ensure that the rotational speed of the spool 19 is properly related to the rotational speed of the conveyor 2 and that the parts 2, 19 rotate in the same direction (as indicated by the arrows 23).

The spool 19 has at least two pairs of ports 24, 25 which discharge jets of compressed air into the registering orifices 15, 16 for the flute 1 which is then located at the ejecting station A, i.e., when the spool 19 is caused to assume a first angular position or, otherwise stated, during a first stage of each revolution of the spool. Furthermore, the spool 19 has a channel for each of the two pairs of ports 24 and 25. One of the channels has an axially parallel section in the form of a bore 26 which communicates with the two ports 24, and two circumferentially extending portions 28 in the form of grooves or cutouts permanently communicating with the section 26 and adapted to repeatedly communicate with a stationary source 31 of compressed air provided in the stationary bearing member 17 as well as with an air evacuating means 33 also provided in the bearing member 17. The other channel includes an axially parallel section or bore 27 permanently communicating with the ports 25 and with two circumferentially extending portions or grooves 29 adapted to repeatedly communicate with a stationary source 32 of compressed air in the stationary bearing member 17 as well as with air evacuating means 34 also provided in the bearing member 17.

The arrangement is such that, during a first stage of each revolution of the spool 19 about its axis, the two pairs of ports 24, 25 and the two channels (26, 28, 28 and 27, 29, 29) establish communication between the compressed air sources 31, 32 and the orifices 15, 16 for that flute 1 which is then located at the ejecting station A (this is shown in FIG. 3). This enables the Jets of compressed air issuing from the orifices 15, 16 to expel an article 4 from the flute 1 at the ejecting station A. On the other hand, when the spool 19 thereupon reaches a different (second) stage of its revolution about its own axis (which is parallel to the axis 3 of the conveyor 2), the ports 24, 25 are sealed from all of the orifices 15, 16 in the cylindrical wall of the conveyor 2 and the two channels (26, 28, 28 and 27, 29, 29) communicate with the air evacuating means 33, 34 so that compressed air can escape from the two channels and into the surrounding atmosphere.

FIG. 3 shows that the stationary source of compressed air is or can be located diametrically opposite the air evacuating means. The source is shown as including a portion of the stationary bearing member 17 which is provided with a row of four inlets including two inlets 31 and two inlets 32. The air evacuating means includes two outlets 33 and two outlets 34 each constituting a bore or hole extending radially or substantially radially of the peripheral surface of the spool 19. It will be seen that the aforementioned first and second stages of each revolution of the spool 19 about its own axis are spaced apart from each other by 180°.

The inlets 31, 32 of the source of compressed air are radial or substantially radial bores (with reference to the axis of the spool 19) and are connected to a suitable air compressor or an accumulator, not shown. In lieu of permanently communicating with the atmosphere, the two pairs of outlets 33, 34 can be (intermittently or permanently) connected to a suitable suction generating device, not shown.

Figure 2:
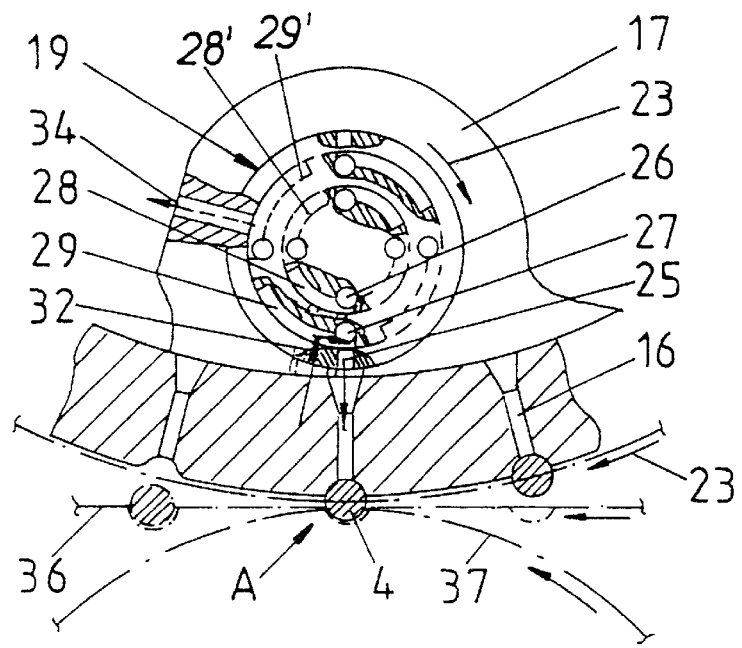
FIG. 2 shows the structure of FIG. 1 but with the conveyor and the valving element in different angular positions in which a rod-shaped article is being pneumatically expelled from a receptacle of the conveyor at the ejecting station.

FIGS. 1 and 2 show that the spool 19 is actually provided with four pairs of channels and is thus capable of initiating an expulsion of four articles 4 during each of its revolutions. Only the circumferentially extending portions (28', 29') of two additional channels are referenced in FIGS. 1 and 2 but these Figures actually show certain portions and/or sections of all four pairs of channels. The four pairs of channels are equidistant from each other as seen in the circumferential direction of the spool 19, i.e., they are disposed at angles of 90° relative to each other. It is clear that the spool 19 further comprises three additional groups or sets of four ports and that each additional group or set includes two ports 24 and two ports 25. It is further clear that the synchronization of rotation of the spool 19 with that of the conveyor 2 ensures that a flute 1 is located at the ejecting station A whenever two pairs of ports in the spool can communicate with the source 31, 32 so that the article 4 in such flute can be expelled into a flute of the rotary conveyor 37 or into a flute in the adjacent upper reach or stretch of an endless belt or chain conveyor 36 (see FIG. 2).

The dimensions of the inlets 31, 32 and outlets 33, 34 (as seen in the circumferential direction of the spool 19) are preferably such that the arcuate portions (28, 29) of the channels in the spool communicate with the inlets 31, 32, thereupon with the outlets 33, 34, again with the inlets, and so forth for certain intervals of time during each revolution of the spool. This ensures that the pressure of air which builds up in the ports 24, 25 at the time these ports communicate with the respective orifices 15, 16 is sufficiently high to ensure abrupt and reliable transfer of an article 4 onto the conveyor 36 or 37, as well as that the channels have sufficient time to cause the pressure of air therein to drop to (or close to) the atmospheric pressure before the channels are again free to receive compressed air from the source including the inlets 31, 32. Articles 4 which reach the ejecting station A can be expelled from their flutes 1 against the opposition which is offered by the suction chamber 13 and the subatmospheric pressure in the respective openings 14.

FIG. 2 shows two article receiving or intercepting conveyors 36 and 37 because it is possible to set up a machine in such a way that the conveyor 36 is retracted (or otherwise deactivated) when the conveyor 37 is in use, and vice versa.

The mode of operation of the improved apparatus will be readily appreciated upon perusal of the preceding description of the structure shown in FIGS. 1 to 3. Thus, and referring to the four ports 24, 25 and the two channels (26, 28, 28 and 27, 29, 29) which are fully shown in the drawings, the four ports begin to receive compressed air (at 31, 32) before they reach the ejecting station A so that the pressure of air is sufficient to expel an article 4 as soon as the ports begin to communicate with the orifices 16, 17 then arriving at the station A. As shown in FIGS. 2 and 3, the arcuate portions 28, 29 of the two channels have a length (as seen circumferentially of the spool 19) which suffices to ensure that the air pressure in the ports 24, 25 has adequate time to build up as well as to expel the article 4 which is then located at the ejecting station A.

The communication between the inlets 31, 32 and the ports 24, 25 is interrupted in response to further rotation of the spool 19 about its axis. This establishes communication between the outlets 33, 34 and the ports 24, 25 so that the pressure in the channels including the sections 26, 27 is reduced to atmospheric. It will be appreciated that some air escapes from the channels via ports 24, 25 and the corresponding orifices 15, 16 during expulsion of an article 4 from its flute 1 at the ejecting station A.

The same procedure takes place during expulsion of articles 4 from certain flutes 1 (or from successive flutes) due to the fact that the spool 19 is provided with four sets of ports and four pairs of channels.

FIG. 1 shows that the pressure of air in the channels including the sections 28, 29 is in the process of rising whereas the pressure of fluid in the two immediately following channels including the portions 28', 29' is in the process of decreasing. FIG. 2 shows that the channels including the portions 28, 29 are in the process of being relieved of some compressed air because the article 4 at the ejecting station A is being expelled from its flute, and that the pressure in the channels including the portions 28', 29' has dropped to atmospheric because the communication between these channels and the outlets 33, 34 is about to be terminated.

An advantage of the improved apparatus is that the aforedescribed relatively long-lasting communication of each pair of channels first with the inlets 31, 32 and thereupon with the outlets 33, 34 (during each revolution of the spool 19) assures the buildup of adequate pressure for reliable expulsion of articles 4 from their flutes 1 and a desirable drop of air pressure (during communication with the outlets 33, 34) in such channels preparatory to renewed communication with the inlets 31, 32. Such construction and mode of operation ensure that selected or successive articles 4 can be reliably expelled from their flutes 1 even if the conveyor 2 is rotated at a high speed and even if the expulsion takes place while the articles 4 are being attracted by the suction chamber 13 via openings 14. However, it is clear that the attraction of articles by suction can be terminated at the time the respective flutes reach the ejecting station A. A reduction of air pressure in the channels (during communication with the outlets 33, 34) is highly desirable and advantageous on the additional ground that compressed air which is being utilized to expel a given article 4 cannot cause an ejection of or otherwise adversely influence one or more adjoining articles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of apparatus for manipulating rod-shaped articles of the tobacco processing industry and, therefore, such adaptations should and are intended to be comprehended within the meaning and range of equivalence of the appended claims.

What is claimed is:

1. Apparatus for pneumatically expelling rod-shaped articles of the tobacco processing industry from peripheral receptacles of a rotary conveyor which transports the receptacles along a predetermined path past an article ejecting station and which has at least one compressed-air orifice for each of said receptacles, comprising:

a rotary valving element;

means for rotating said valving element in sychronism with said conveyor;

a stationary source of compressed air adjacent said valving element; and air evacuating means adjacent said valving element, said valving element having at least one substantially radially extending port and at least one channel extending in part circumferentially of said valving element to connect said at least one port with said source and with the orifice for a receptacle at said station during a first stage of each revolution of said valving element and to thereafter connect said at least one port with said air evacuating means for releasing air pressure in the channel during a second stage of each revolution of said valving element.

2. The apparatus of claim 1, wherein said conveyor has a plurality of orifices for each of said receptacles, said valving element having a plurality of ports, at least one for each of said plurality of orifices, and a plurality of channels each communicating with at least one of said plurality of ports.

3. The apparatus of claim 1, wherein said receptacles are elongated flutes and said conveyor has a plurality of groups of orifices for each of said flutes, the orifices of each group being spaced apart from each other in the longitudinal direction of the respective flute.

4. The apparatus of claim 1, wherein said valving element has at least one substantially radially extending additional port and at least one additional channel extending in part circumferentially of said valving element and connecting said additional port with said source and with said orifice for a receptacle at said station during a third stage of each revolution of said valving element to thereafter connect said at least one additional port with said air evacuating means during a fourth stage of each revolution of said valving element.

5. The apparatus of claim 1, wherein said conveyor is rotatable about a first axis and said valving element is rotatable about a second axis parallel to said first axis.

6. The apparatus of claim 1, wherein the duration of each first stage at least approximates the duration of each second stage.

7. The apparatus of claim 1, wherein said at least one channel includes a section communicating with said at least one port and extending substantially in the axial direction of said valving element.

8. The apparatus of claim 7, wherein said at least one channel further includes a portion connecting said section with said source and said air evacuating means during the respective stages of each revolution of said valving element.

9. The apparatus of claim 1, further comprising at least one stationary bearing member including said source of compressed air and said air evacuating means, said valving element being rotatably journalled in said at least one bearing member.

10. The apparatus of claim 5, wherein said valving element comprises a shaft.

11. The apparatus of claim 1, wherein said receptacles include elongated flutes and said conveyor has a plurality of orifices for each of said flutes, the orifices of each of said pluralities of orifices being spaced apart from each other in the longitudinal direction of the respective flute and said valving element having a discrete port for each orifice of a plurality of orifices, said valving element having at least two channels.

12. The apparatus of claim 11, wherein the conveyor has two pairs of orifices for each of said flutes and said valving element has four ports each communicating with a discrete orifice for the flute at said station, each of said at least two channels of said element connecting two of said ports with the respective pair of orifices, each connecting such ports with said source during said first stage of each revolution of said valving element and each connecting such ports with said air evacuating means during said second stage of each of said revolutions.

13. The apparatus of claim 1, wherein said conveyor is hollow and at least a portion of said valving element is confined in said conveyor.

14. The apparatus of claim 13, wherein said conveyor includes a cylindrical wall having an external surface provided with said receptacles and an internal surface adjacent said portion of said valving element.

15. The apparatus of claim 1, wherein the duration of each of said stages is selected to ensure the establishment in said ports of a predetermined maximum air pressure during the first stage and to ensure the establishment in said ports of a predetermined minimum air pressure during the second stage of each revolution of said valving element.

16. The apparatus of claim 15, wherein said predetermined minimum air pressure at least approximates atmospheric pressure.

17. The apparatus of claim 15, wherein each first stage is selected to permit a gradual rise of air pressure in said ports and each second stage is selected to effect a gradual drop of air pressure in said ports.

18. The apparatus of claim 1, further comprising means for driving said conveyor, said means for rotating said valving element in synchronism being arranged to receive motion from said driving means.

19. The apparatus of claim 18, wherein said driving means comprises a shaft and said means for rotating said valving element comprises at least one endless flexible element trained over portions of said shaft and said valving element.

20. The apparatus of claim 19, wherein said at least one endless flexible element includes a toothed belt.

* * * * *